US012691580B2

(12) United States Patent
Yamamoto et al.

(10) Patent No.: US 12,691,580 B2
(45) Date of Patent: Jul. 28, 2026

(54) CONTROL SYSTEM, CONTROL METHOD, AND NON-TRANSITORY COMPUTER-READABLE MEDIUM

(71) Applicants: Takashi Yamamoto, Toyota Aichi-ken (JP); Yuka Iwanaga, Toyokawa Aichi-ken (JP); Masayoshi Tsuchinaga, Nisshin Aichi-ken (JP); Takemitsu Mori, Nisshin Aichi-ken (JP); Kosei Tanada, Toyota Aichi-ken (JP); Masahiro Takahashi, Nagakute Aichi-ken (JP)

(72) Inventors: Takashi Yamamoto, Toyota Aichi-ken (JP); Yuka Iwanaga, Toyokawa Aichi-ken (JP); Masayoshi Tsuchinaga, Nisshin Aichi-ken (JP); Takemitsu Mori, Nisshin Aichi-ken (JP); Kosei Tanada, Toyota Aichi-ken (JP); Masahiro Takahashi, Nagakute Aichi-ken (JP)

(73) Assignees: TOYOTA JIDOSHA KABUSHIKI KAISHA, Toyota (JP); NAGOYA DENKI EDUCATIONAL FOUNDATION, Nagoya (JP)

( * ) Notice: Subject to any disclaimer, the term of this patent is extended or adjusted under 35 U.S.C. 154(b) by 15 days.

(21) Appl. No.: 18/824,493

(22) Filed: Sep. 4, 2024

(65) Prior Publication Data

US 2025/0083321 A1 Mar. 13, 2025

(30) Foreign Application Priority Data

Sep. 8, 2023 (JP) ................................. 2023-146104

(51) Int. Cl.
*B25J 9/16* (2006.01)
*B25J 11/00* (2006.01)

(52) U.S. Cl.
CPC ........... *B25J 9/1666* (2013.01); *B25J 9/1612* (2013.01); *B25J 9/163* (2013.01); *B25J 11/0015* (2013.01)

(58) Field of Classification Search
CPC ........ B25J 9/1666; B25J 9/1612; B25J 9/163; B25J 11/0015; B25J 13/00; B25J 9/16; G05B 19/04
See application file for complete search history.

(56) References Cited

U.S. PATENT DOCUMENTS 9,895,803 B1 * 2/2018 Oslund ................. B25J 9/1666
2017/0075348 A1 * 3/2017 Kratz ................... G05D 1/0044
(Continued)

FOREIGN PATENT DOCUMENTS

JP 2021-094605 A 6/2021

*Primary Examiner* — Adam R Mott
*Assistant Examiner* — Sagar KC
(74) *Attorney, Agent, or Firm* — Dinsmore & Shohl LLP

(57) ABSTRACT

A control system, a control method, and a program that interact with a user with regard to correction of handwritten input information are provided. A control system determines an operation to be performed by a robot based on handwritten input information input to an interface and controls the operation performed by the robot. The control system includes: a handwritten input information reception unit that receives an input of the handwritten input information; a determination unit that determines whether or not the handwritten input information needs to be corrected based on feasibility or efficiency of the operation to be performed based on the handwritten input information; and a presentation unit that presents information about the correction of the handwritten input information to a user when the handwritten input information needs to be corrected.

8 Claims, 12 Drawing Sheets

(56) References Cited

U.S. PATENT DOCUMENTS

| | | | |
|---|---|---|---|
| 2019/0176321 A1* | 6/2019 | Afrouzi | B25J 9/1666 |
| 2019/0235490 A1* | 8/2019 | Tsusaka | G05D 1/0016 |
| 2020/0117213 A1* | 4/2020 | Tian | G05D 1/0274 |
| 2020/0139545 A1* | 5/2020 | Hayashi | B25J 9/1664 |
| 2020/0164507 A1* | 5/2020 | Murase | B25J 9/04 |
| 2021/0178581 A1* | 6/2021 | Yamamoto | G06V 20/20 |
| 2021/0178598 A1* | 6/2021 | Yamamoto | B25J 9/1689 |
| 2022/0126445 A1* | 4/2022 | Zhu | G06N 3/08 |
| 2024/0238820 A1* | 7/2024 | Kim | B05B 12/085 |
| 2025/0068172 A1* | 2/2025 | Tamatani | G05D 1/248 |
| 2025/0076889 A1* | 3/2025 | Muro | G05D 1/229 |
| 2025/0144260 A1* | 5/2025 | Kim | B25J 13/08 |

* cited by examiner

100

100

300

310

310

310

310

CONTROL SYSTEM, CONTROL METHOD, AND NON-TRANSITORY COMPUTER-READABLE MEDIUM

CROSS REFERENCE TO RELATED APPLICATIONS

This application is based upon and claims the benefit of priority from Japanese patent application No. 2023-146104, filed on Sep. 8, 2023, the disclosure of which is incorporated herein in its entirety by reference.

BACKGROUND

The present disclosure relates to a control system, a control method, and a program.

Japanese Unexamined Patent Application Publication No. 2021-094605 discloses a remote control system that controls operations performed by a robot based on handwritten input information input to an interface.

SUMMARY

In some cases, a robot cannot be controlled based on handwritten input information due to various factors such as constraints on operations performed by the robot and the presence of obstacles. Further, in some cases, there is an operation that is more appropriate and efficient than the operation performed based on handwritten input information. In such cases, an operation performed by a robot desired by a user is different from that actually performed by the robot, and therefore the operability of the robot for the user may be reduced.

The present disclosure has been made in order to solve the above-described problem and an object thereof is to provide a control system, a control method, and a program that interact with a user with regard to correction of handwritten input information.

A control system according to an embodiment is a control system configured to determine an operation to be performed by a robot based on handwritten input information input to an interface and control the operation performed by the robot, the control system including:

a handwritten input information reception unit configured to receive an input of the handwritten input information;

a determination unit configured to determine whether or not the handwritten input information needs to be corrected based on feasibility or efficiency of the operation to be performed based on the handwritten input information; and a presentation unit configured to present information about the correction of the handwritten input information to a user when the handwritten input information needs to be corrected.

The handwritten input information may include trajectory information of the input performed using a finger, a stylus pen, a pointing device, an Augmented Reality (AR) device, a Virtual Reality (VR) device, or a Mixed Reality (MR) device.

When the handwritten input information needs to be corrected, the presentation unit may correct the handwritten input information and present the corrected handwritten input information to the user.

When the handwritten input information needs to be corrected, the presentation unit may present information about a part of the robot that interferes with an obstacle to the user, the robot operating based on the handwritten input information.

When a part or all of the handwritten input information is included in a predetermined area of an input screen, the determination unit may determine that the handwritten input information needs to be corrected, and when the handwritten input information reception unit displays the input screen, the handwritten input information reception unit may display the predetermined area and an area other than the predetermined area so that they are distinguishable from each other.

When the handwritten input information reception unit displays the input handwritten input information, the handwritten input information reception unit may set a thickness of a line included in the handwritten input information based on a size of the robot.

The presentation unit may correct a position of the handwritten input information using a result of segmentation based on a machine learning.

A control method according to an embodiment is a control method for determining an operation to be performed by a robot based on handwritten input information input to an interface and controlling the operation performed by the robot, the control method including:

receiving an input of the handwritten input information;

determining whether or not the handwritten input information needs to be corrected based on feasibility or efficiency of the operation to be performed based on the handwritten input information; and presenting information about the correction of the handwritten input information to a user when the handwritten input information needs to be corrected.

A program according to an embodiment is a program for causing a computer to perform a control method for determining an operation to be performed by a robot based on handwritten input information input to an interface and controlling the operation performed by the robot, the control method including:

receiving an input of the handwritten input information;

determining whether or not the handwritten input information needs to be corrected based on feasibility or efficiency of the operation to be performed based on the handwritten input information; and presenting information about the correction of the handwritten input information to a user when the handwritten input information needs to be corrected.

According to the present disclosure, it is possible to provide a control system, a control method, and a program that interact with a user with regard to correction of handwritten input information.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

The present disclosure will be described hereinafter through embodiments of the disclosure. However, the disclosure according to the claims is not limited to the following embodiments. Further, all the components described in the embodiments are not necessary for solving the problem.

Figure 1:
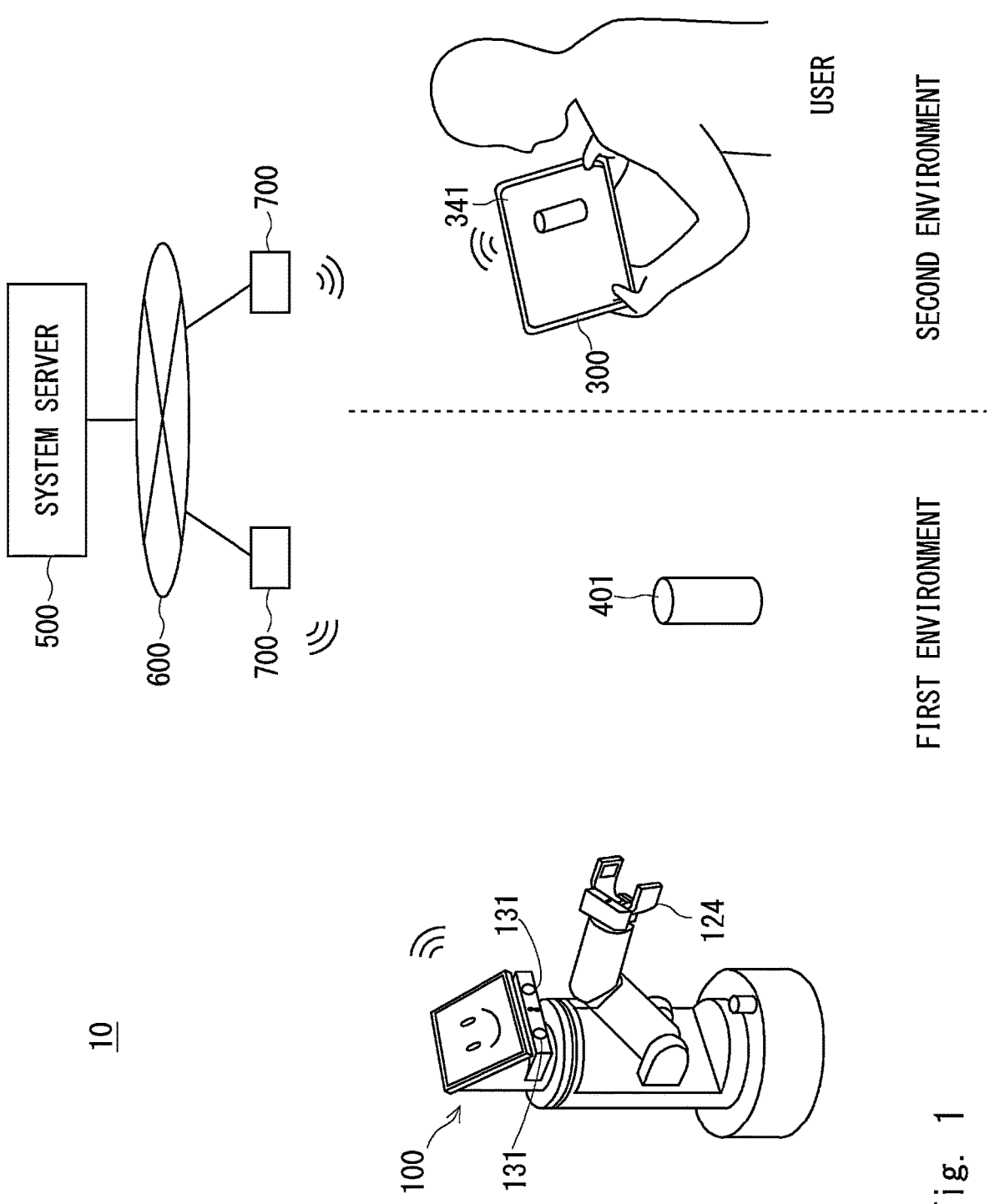
FIG. 1 is a conceptual diagram showing an example of an overall environment in which a control system according to a first embodiment is used.

FIG. 1 is a conceptual diagram showing an example of an overall environment in which a control system 10 according to a first embodiment is used. A robot 100 that performs various types of operations in a first environment is remotely controlled via a system server 500 connected to an Internet 600 by allowing a user who is a remote operator present in a second environment distant from the first environment to operate a remote terminal 300 (an operation terminal).

In the first environment, the robot 100 is connected to the Internet 600 via a wireless router 700. Further, in the second environment, the remote terminal 300 is connected to the Internet 600 via the wireless router 700. The robot 100 performs a grasping operation by a hand 124 in accordance with an operation of the remote terminal 300.

The robot 100 captures an image of the first environment in which the robot 100 is located by a stereo camera 131 (an image capturing unit), and transmits the captured image to the remote terminal 300 through the Internet 600. Further, the robot 100 recognizes a graspable object that can be grasped by the hand 124 based on the captured image. In the first environment, for example, an object 401 to be grasped, such as a can, is present. Note that the shape of the object 401 to be grasped is not limited to a cylindrical shape.

The remote terminal 300 is, for example, a tablet terminal, and includes a display panel 341 disposed so that a touch panel is superimposed thereon. The captured image received from the robot 100 is displayed on the display panel 341, and thus a user can visually recognize the first environment in which the robot 100 is located in an indirect manner. Further, a user can input handwritten input information by handwriting to the captured image displayed on the display panel 341. The handwritten input information indicates, for example, rotation of the image capturing unit, a traveling route of the robot 100, an object to be grasped by the hand

124, from which direction the hand 124 grasps the object to be grasped, and the like. As a method for inputting the handwritten input information, for example, a method in which a target part of a captured image is touched using a user's finger, a stylus pen, or the like on a touch panel disposed so as to be superimposed on the display panel 341 may be employed. However, the method therefor is not limited thereto. The handwritten input information may be trajectory information of the input performed using a finger, a stylus pen, or a pointing device (e.g., a mouse). Further, the handwritten input information may include trajectory information of the input performed by a part of a user's body (e.g., a finger), using an Augmented Reality (AR) device, a Virtual Reality (VR) device, or a Mixed Reality (MR) device, which trajectory information is input into a three-dimensional input space.

Figure 2:
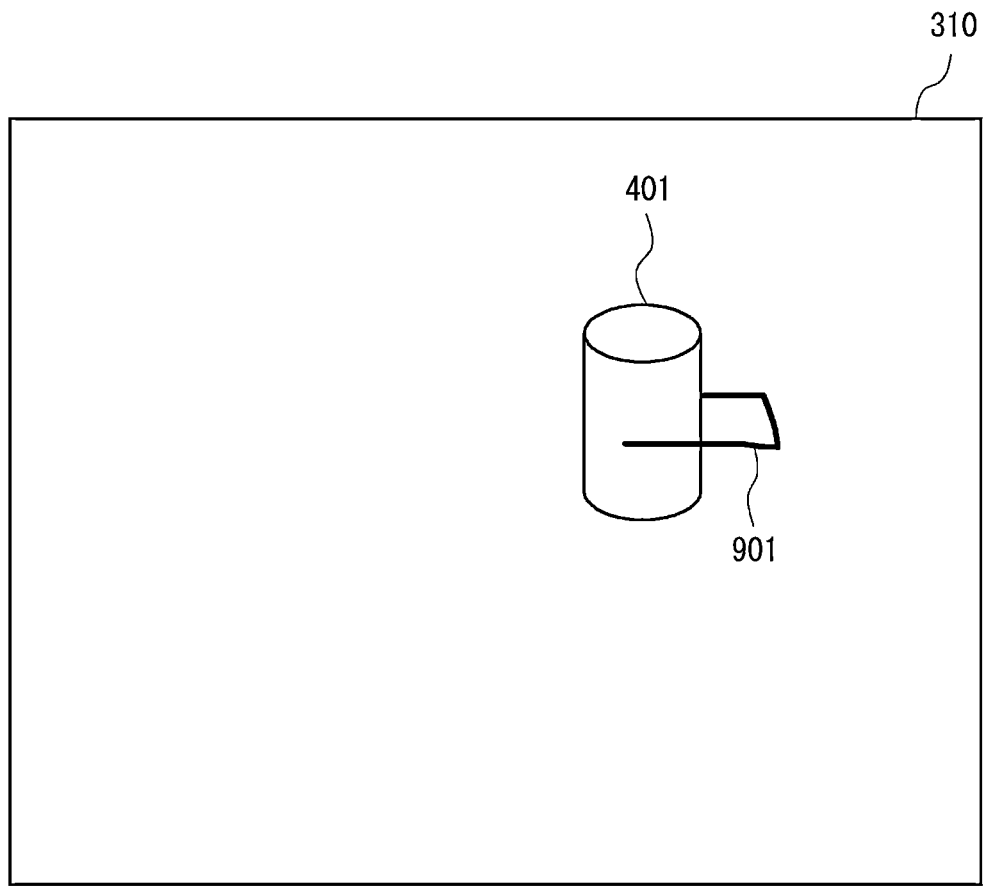
FIG. 2 is a diagram showing an example of handwritten input information.
Figure 3:
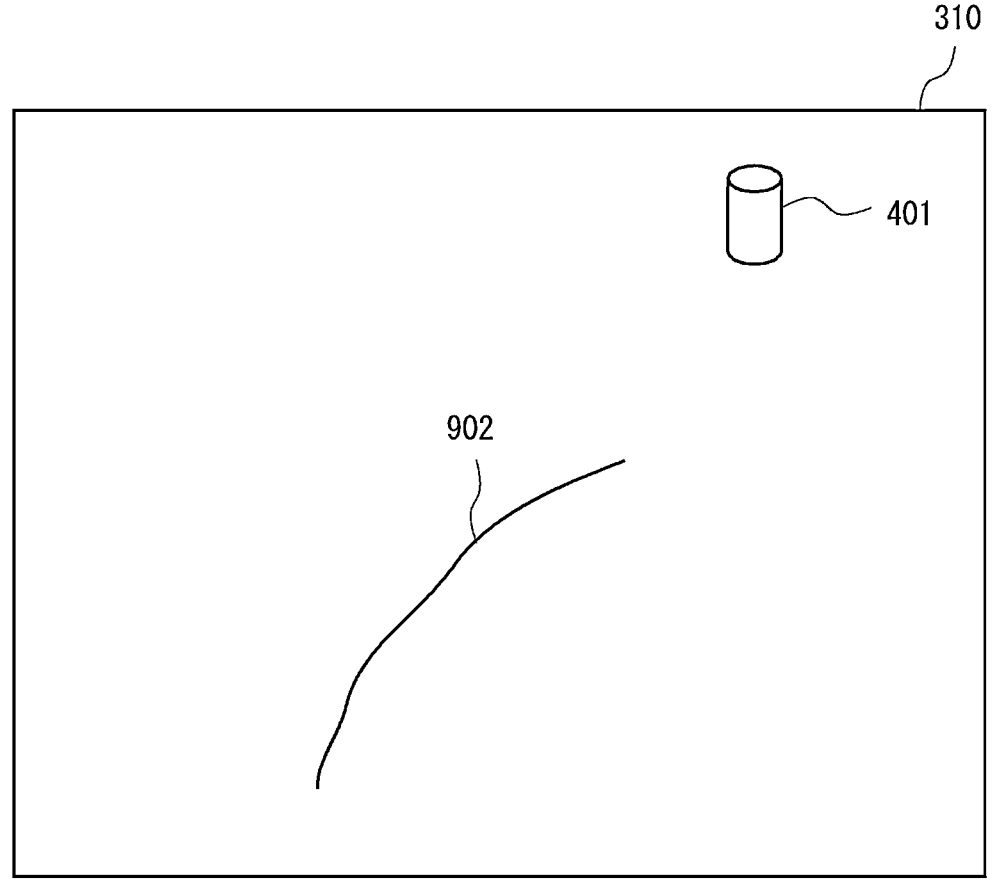
FIG. 3 is a diagram showing an example of handwritten input information.

Each of FIGS. 2 and 3 is a diagram showing an example of handwritten input information input to a captured image 310. The example of FIG. 2 shows handwritten input information 901 indicating a simulation in which the object 401 to be grasped is grasped from the side thereof. The example of FIG. 3 shows handwritten input information 902 indicating a simulated traveling route of the robot 100. Further, handwritten input information indicating a simulated rotation of the image capturing unit may be input, although it is not illustrated. For example, when a stylus pen or the like is moved vertically and horizontally on the captured image 310, the line of sight of the image capturing unit moves vertically and horizontally so that it follows the stylus pen or the like. The robot 100 may change its line of sight by rotating the head thereof, or may change its line of sight by turning at a position where the robot 100 is currently located. For example, when the image capturing unit is rotated in the pan direction, the robot 100 may turn at a position where the robot 100 is currently located, while when the image capturing unit is rotated in the tilt direction, the head part of the robot 100 may be inclined. Note that the handwritten input information may include handwritten character information. The handwritten input information input by a user to the captured image is transmitted to the robot 100 through the Internet 600.

The control system 10 determines an operation to be performed by a robot based on handwritten input information input to an interface and controls the operation performed by the robot. The control system 10 determines whether or not the handwritten input information needs to be corrected based on feasibility or efficiency of the operation to be performed based on the handwritten input information. When the handwritten input information needs to be corrected, the control system 10 presents information about the correction of the handwritten input information to a user. The control system 10 may, for example, present the corrected handwritten input information or may present information indicating a part of the handwritten input information that needs to be corrected. The control system 10 may operate the robot 100 in response to a user's determination operation performed after the information is presented or may present the information after the robot 100 is operated based on the corrected handwritten input information.

Figure 4:
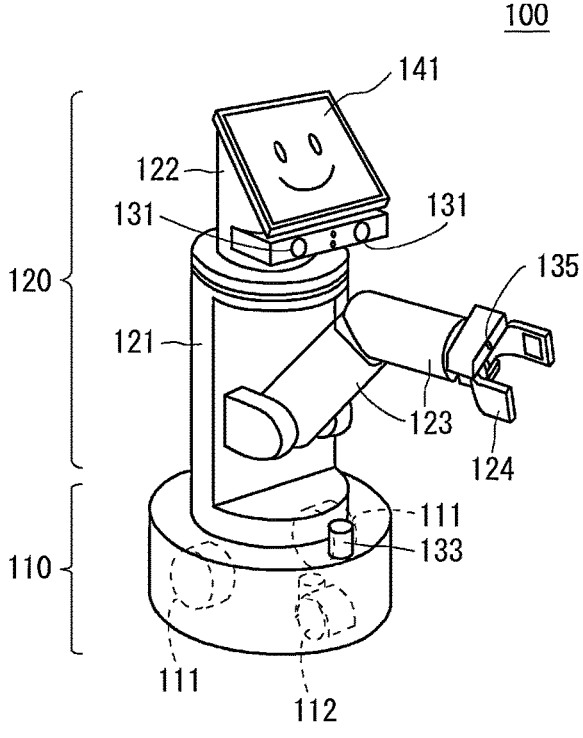
FIG. 4 is an external perspective view showing an example of an external configuration of a robot.

FIG. 4 is an external perspective view showing an example of an external configuration of the robot 100. The robot 100 is mainly formed of a carriage part 110 and a main body part 120. The carriage part 110 supports two driving wheels 111 and a caster 112, each of which is in contact with a traveling surface, inside its cylindrical housing. The two driving wheels 111 are disposed so that the centers of their rotational axes coincide with each other. Each of the driving wheels 111 is rotationally driven by a motor (not shown) independently of each other. The caster 112 is a trailing wheel and is disposed so that its pivotal axis extending from the carriage part 110 in the vertical direction axially supports the wheels at a place some distance from the rotation axes thereof. Further, the caster 112 follows the carriage part 110 so as to move in the moving direction of the carriage part 110.

The carriage part 110 is provided with a laser scanner 133 in a peripheral part of its top surface. The laser scanner 133 scans a certain range on the horizontal plane at intervals of a certain stepping angle and outputs information as to whether or not there is an obstacle in each direction. Further, when there is an obstacle, the laser scanner 133 outputs a distance to the obstacle.

The main body part 120 includes, mainly, a body part 121 mounted on the top surface of the carriage part 110, a head part 122 placed on the top surface of the body part 121, an arm 123 supported on the side surface of the body part 121, and the hand 124 disposed at the tip of the arm 123. The arm 123 and the hand 124 are driven by motors (not shown) and grasp an object to be grasped. The body part 121 is driven by a motor (not shown) and grasps an object to be grasped. The body part 121 can rotate around a vertical axis with respect to the carriage part 110 by a driving force of a motor (not shown).

The head part 122 mainly includes the stereo camera 131 and a display panel 141. The stereo camera 131, which has a configuration in which two camera units having the same angle of view are arranged so as to be space apart from each other, outputs imaging signals of images captured by the respective camera units.

The display panel 141 is, for example, a liquid crystal display panel, and displays an animated face of a preset character and displays information about the robot 100 in the form of text or by using icons. By displaying the face of the character on the display panel 141, it is possible to give an impression that the display panel 141 is a pseudo face part to people present near the robot 100.

The head part 122 can rotate around a vertical axis with respect to the body part 121 by a driving force of a motor (not shown). Thus, the stereo camera 131 can capture an image in any direction. Further, the display panel 141 can show displayed contents in any direction.

Figure 5:
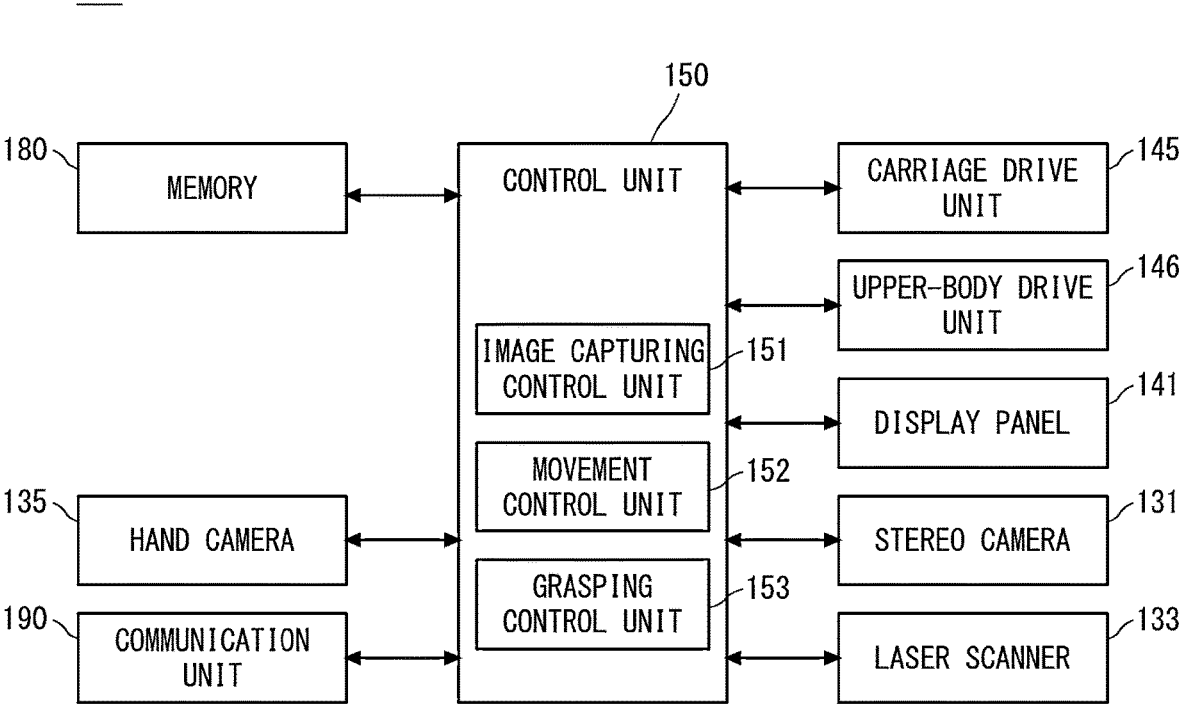
FIG. 5 is a block diagram showing an example of a block configuration of the robot.

FIG. 5 is a block diagram showing an example of a block configuration of the robot 100. Main elements related to control of operations performed based on handwritten input information will be described below. However, the robot 100 may include in its configuration elements other than the above ones and may include additional elements contributing to the control of operations performed based on handwritten input information.

A control unit 150 is, for example, a central processing unit (CPU), and is housed in, for example, a control box included in the body part 121. A carriage drive unit 145 includes the driving wheels 111, and a driving circuit and motors for driving the driving wheels 111. The control unit 150 performs rotation control of the driving wheels by sending a driving signal to the carriage drive unit 145. Further, the control unit 150 receives a feedback signal such as an encoder signal from the carriage drive unit 145 and recognizes a moving direction and a moving speed of the carriage part 110.

An upper-body drive unit 146 includes the arm 123 and the hand 124, the body part 121, the head part 122, and driving circuits and motors for driving these components. The control unit 150 enables a grasping operation and a gesture by sending a driving signal to the upper-body drive unit 146. Further, the control unit 150 receives a feedback signal such as an encoder signal from the upper-body drive unit 146, and recognizes positions and moving speeds of the arm 123 and the hand 124, and orientations and rotation speeds of the body part 121 and the head part 122.

The display panel 141 receives an image signal generated by the control unit 150 and displays an image thereof. Further, as described above, the control unit 150 may generate an image signal of a character or the like and display an image thereof on the display panel 141.

The stereo camera 131 captures the first environment in which the robot 100 is located in accordance with a request from the control unit 150 and passes an imaging signal to the control unit 150. The control unit 150 performs image processing by using the imaging signal and converts the imaging signal into a captured image in accordance with a predetermined format. The laser scanner 133 detects whether or not there is an obstacle in the moving direction of the robot 100 in accordance with a request from the control unit 150 and passes a detection signal, which is a result of the detection, to the control unit 150.

A hand camera 135 is, for example, a distance image sensor, and is used to recognize a distance to an object to be grasped, a shape of an object to be grasped, a direction in which an object to be grasped is located, and the like. The hand camera 135 includes an image pickup device in which pixels for performing a photoelectrical conversion of an optical image incident from a target space are two-dimensionally arranged, and outputs a distance to a subject to the control unit 150 for each of the pixels. Specifically, the hand camera 135 includes an irradiation unit that irradiates a pattern light to the target space, and receives the reflected light of the pattern light by the image pickup device to output a distance to the subject captured by each of the pixels based on a distortion and a size of the pattern in the image. Note that the control unit 150 recognizes a state of a wider surrounding environment by the stereo camera 131 and recognizes a state in the vicinity of an object to be grasped by the hand camera 135.

A memory 180 is a nonvolatile storage medium. For example, a solid-state drive is used for the memory 180. The memory 180 stores, in addition to a control program for controlling the robot 100, various parameter values, functions, lookup tables, and the like used for the control and the calculation. The memory 180 may store a trained model or the like that uses an image of handwritten input information as an input image and outputs the meaning of a grasping operation simulated by the handwritten input information.

A communication unit 190 is, for example, a wireless LAN unit, and performs radio communication with the wireless router 700. The communication unit 190 receives handwritten input information sent from the remote terminal 300 and passes it to the control unit 150. Further, the communication unit 190 transmits the captured image captured by the stereo camera 131 to the remote terminal 300 in accordance with the control of the control unit 150.

The control unit 150 performs overall control of the robot 100 and various calculation processes by executing a control program read from the memory 180. Further, the control unit 150 also serves as a function execution unit that executes various calculations and controls related to the overall control. As such function execution units, the control unit 150 includes an image capturing control unit 151, a movement control unit 152, and a grasping control unit 153. Further, at least some of the functions of a determination unit 352 and a presentation unit 353, which will be described later, may be included in the control unit 150.

The image capturing control unit 151 changes a direction from which the stereo camera 131 captures an image based on handwritten input information. The image capturing control unit 151 may, for example, rotate the carriage part 110 or the head part 122 in the direction in which a stylus pen or a finger is moved.

The movement control unit 152 moves the carriage part 110 based on handwritten input information. For example, when handwritten input information includes a line, the movement control unit 152 generates a trajectory passing through points on the line. Then, the movement control unit 152 may send a driving signal to the carriage drive unit 145 so that the carriage part 110 moves along the trajectory.

The grasping control unit 153 grasps an object to be grasped based on handwritten input information. The grasping control unit 153, for example, recognizes an object to be grasped included in a captured image using a trained model for recognition, and generates a trajectory of the hand 124 so that the hand 124 grasps the object to be grasped from a direction corresponding to handwritten input information. Then, the grasping control unit 153 may transmit a driving signal corresponding to the generated trajectory to the upper-body drive unit 146.

Further, the grasping control unit 153 may place an object to be grasped on a table, a floor, or the like based on handwritten input information. For example, the grasping control unit 153 generates a trajectory of the hand 124 so that the hand 124 places an object to be grasped at a position specified by handwritten input information. Then, the grasping control unit 153 may transmit a driving signal corresponding to the generated trajectory to the upper-body drive unit 146.

Figure 6:
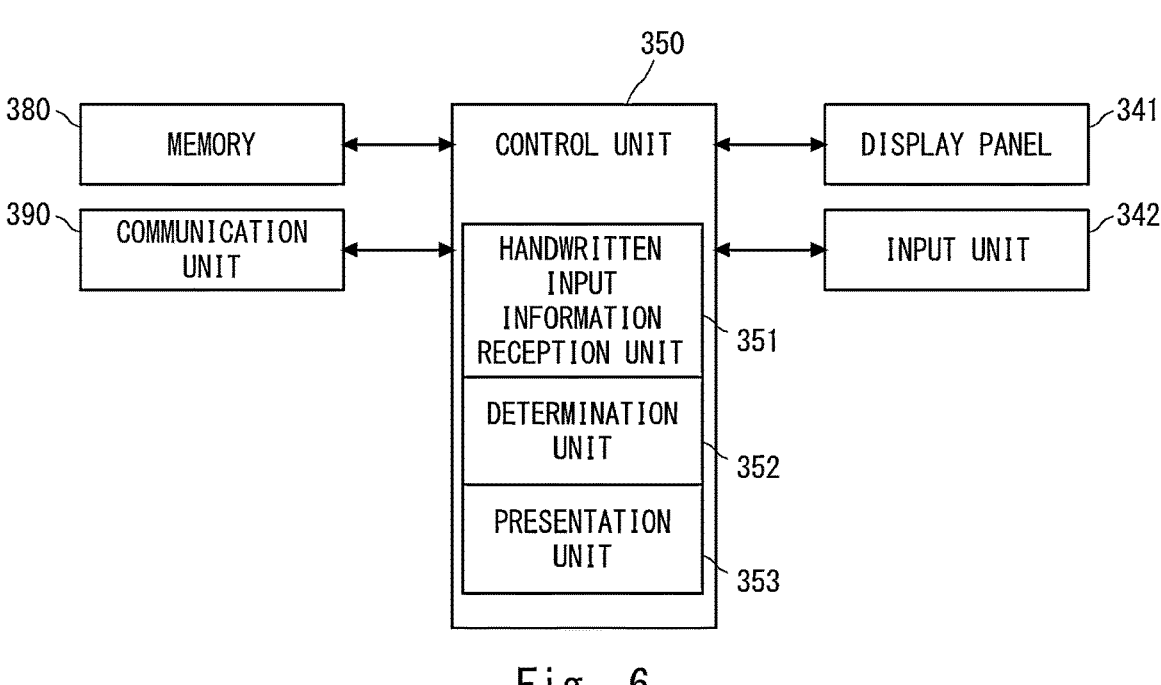
FIG. 6 is a block diagram showing an example of a block configuration of a remote terminal.

FIG. 6 is a block diagram showing an example of a block configuration of the remote terminal 300. Main elements related to processing for inputting handwritten input information to the captured image received from the robot 100 will be described below. However, the remote terminal 300 may include in its configuration elements other than the above ones and may include additional elements contributing to the processing for inputting handwritten input information.

A control unit 350 is, for example, a central processing unit (CPU) that performs overall control of the remote terminal 300 and various calculation processes by executing a control program read from a memory 380. Further, the control unit 350 also serves as a function execution unit that executes various calculations and controls related to the overall control. As such function execution units, the control unit 350 includes a handwritten input information reception unit 351, the determination unit 352, and the presentation unit 353.

The handwritten input information reception unit 351 displays a captured image on the display panel 341 and receives an input of handwritten input information from an input unit 342. Note that the handwritten input information reception unit 351 may receive an input into a three-dimensional space. The captured image may be a three-dimensional image. Further, the handwritten input information reception unit 351 superimposes an image corresponding to the input handwritten input information on the captured image.

The handwritten input information reception unit 351 may display a predetermined area included in the captured image and an area other than the predetermined area so that they are distinguishable from each other. The predetermined area may be, for example, an area where an obstacle (e.g., a desk, a floor) obstructing the operation performed by the robot 100 or an area where the robot 100 is included. When a part or all of the handwritten input information is included in a predetermined area, it is determined that the handwritten input information needs to be corrected.

Figure 7:
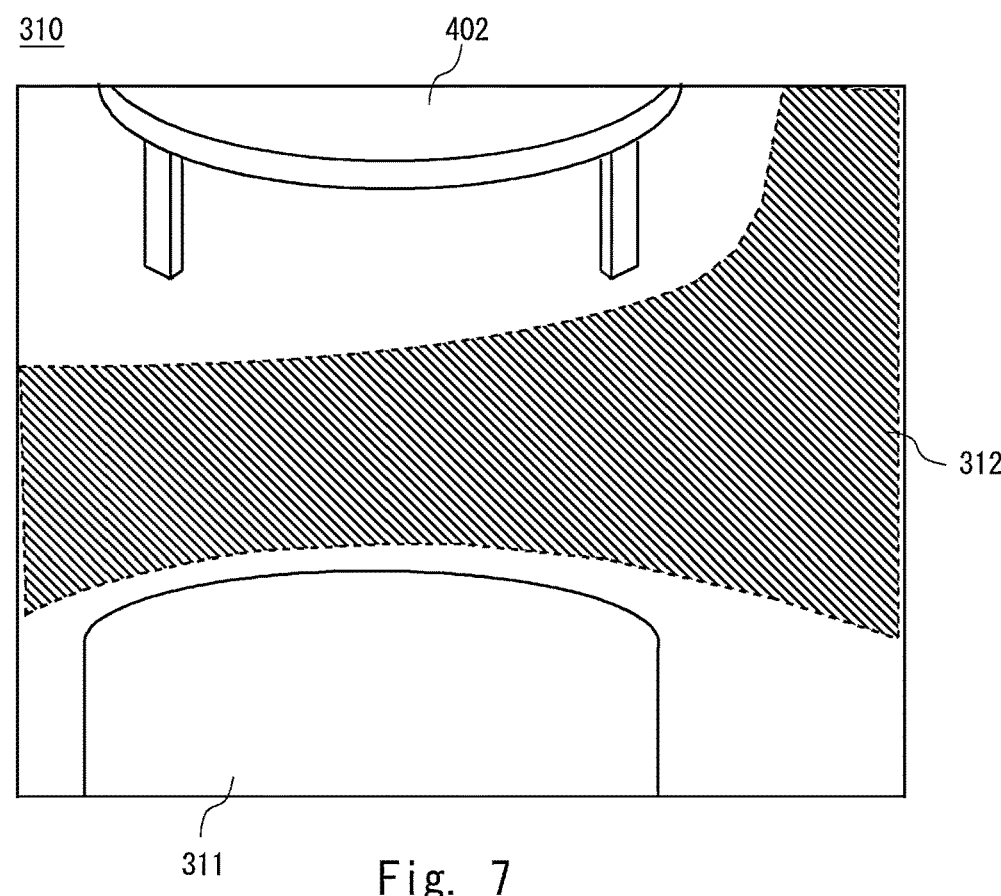
FIG. 7 is a diagram for explaining an example of a captured image to be displayed.

FIG. 7 is a diagram for explaining an example of the captured image 310 displayed by the handwritten input information reception unit 351. The captured image 310 includes an obstacle 402 that prevents the operation performed by the robot 100. Further, the captured image 310 includes an area 311 where a part of the robot 100 is included. The predetermined area described above includes an area where the obstacle 402 is included and the area 311. When a part or all of the handwritten input information indicating a traveling route of the robot 100 is included in the predetermined area, the robot 100 cannot operate based on the handwritten input information. An area 312 other than the predetermined area is an area into which handwritten input information can be input. Therefore, the handwritten input information reception unit 351 displays the area 312 and an area other than the area 312 in different colors. By doing so, it is possible to urge a user to input handwritten input information into an appropriate area. The handwritten input information reception unit 351 may, for example, apply a specific light color to the area 312. The handwritten input information reception unit 351 may improve the accuracy of identification of each of the predetermined area and the area 312 based on segmentation information. The segmentation information is information indicating a result of segmentation performed on the captured image 310 using a learning model or the like. Note that the handwritten input information reception unit 351 may change the direction from which an image is captured in a case where the image capturing unit is facing above or below a certain range when a user starts to input the handwritten input information.

Figure 8:
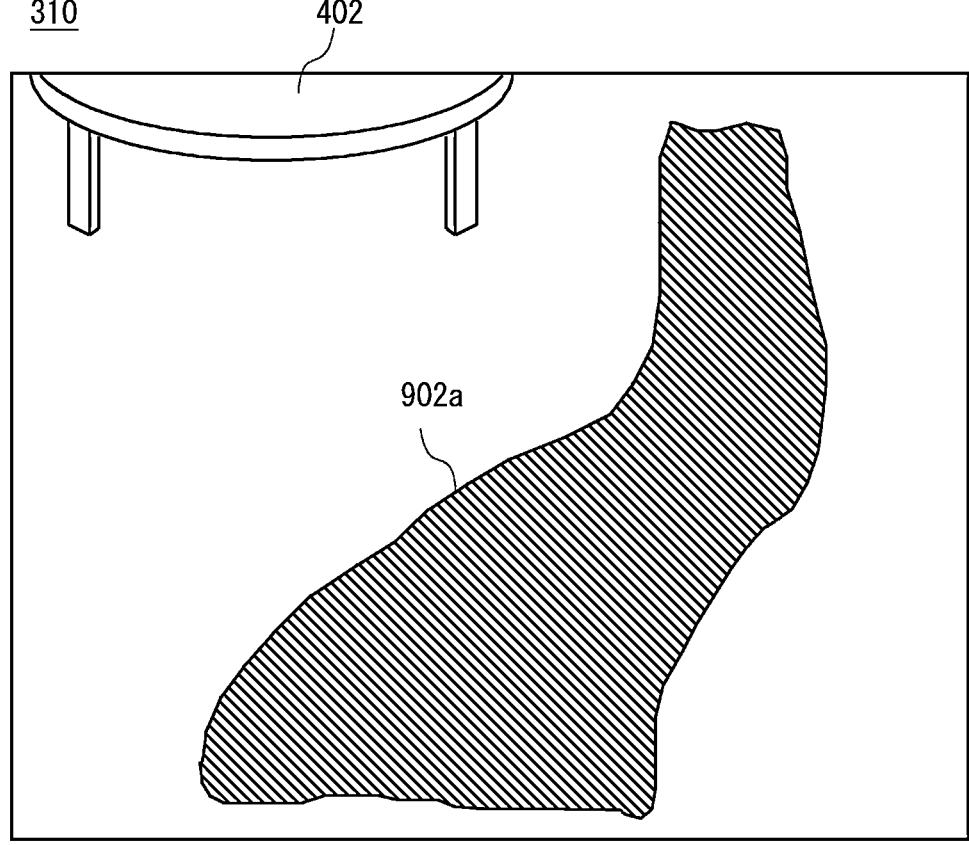
FIG. 8 is a diagram for explaining an example of a captured image to be displayed.

Further, when the handwritten input information is displayed on the captured image, the handwritten input information reception unit 351 may set the thickness of the line included in the handwritten input information based on the size of the robot 100. By doing so, a user can input appropriate handwritten input information by taking into account the size of the robot 100. FIG. 8 is a diagram for explaining an example of the captured image 310 displayed by the handwritten input information reception unit 351. Handwritten input information 902a indicating a traveling route of the robot 100 is shown in the captured image 310. The thickness of the line in the handwritten input information 902a is set in accordance with the size of the robot 100. In the captured image 310, the apparent size of an object that is far from the robot 100 is smaller than the actual size thereof. Therefore, the thickness of the line corresponding to a position far from the current position of the robot 100 is set to be thin. As a result, for a position far from the current position of the robot 100, appropriate handwritten input information can be input.

Referring back to FIG. 6, the determination unit 352 determines whether or not the handwritten input information needs to be corrected based on feasibility or efficiency of the operation to be performed based on the handwritten input information. For example, when a part or all of the handwritten input information indicating a traveling route of the robot 100 is included in a predetermined area, the operation to be performed based on the handwritten input information cannot be performed. Further, when the stability of the grasping operation performed by the robot 100 in accordance with the handwritten input information is low, the operation to be performed based on the handwritten input information cannot be performed. In the above cases, the determination unit 352 determines that the handwritten input information needs to be corrected. Further, the determination unit 352 may determine that the handwritten input information needs to be corrected not only when the operation cannot be performed but also when the efficiency of the operation is low.

When handwritten input information needs to be corrected, the presentation unit 353 presents information about the correction of the handwritten input information to a user. By doing so, the remote terminal 300 can perform interaction with a user with regard to the correction of handwritten input information. The presentation unit 353 may urge a user to correct handwritten input information by presenting information to the user. The correction of handwritten input information may be an input of appropriate handwritten input information. Further, the presentation unit 353 may correct handwritten input information and present the corrected handwritten input information to a user.

Figure 9:
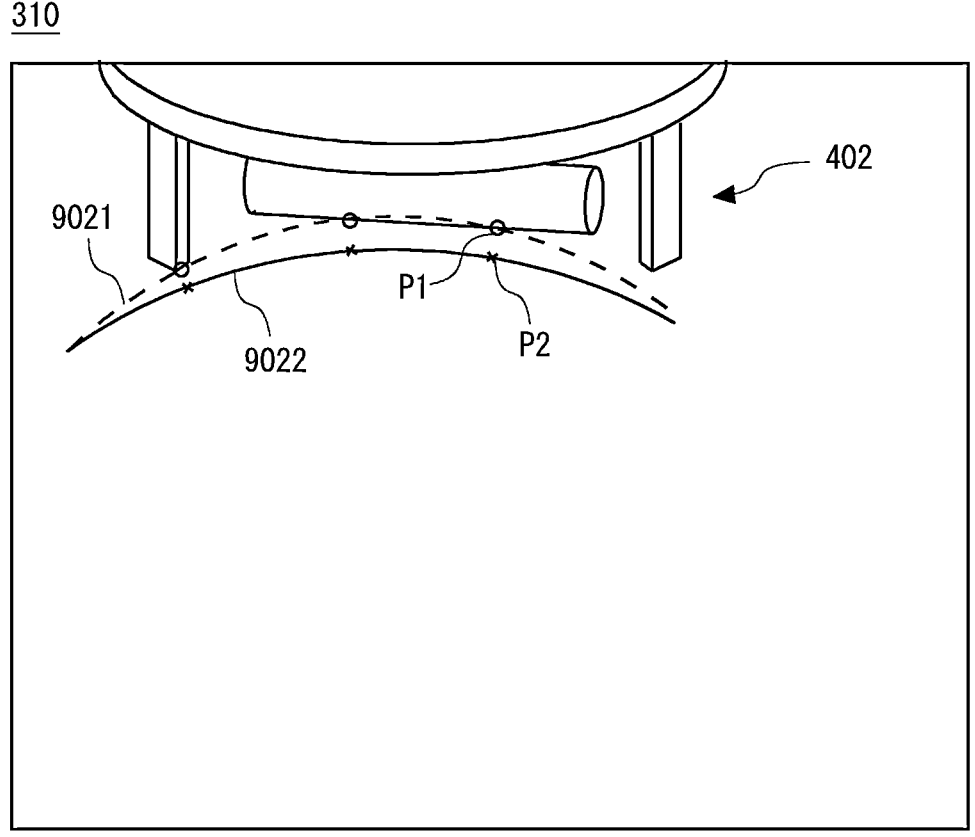
FIG. 9 is a diagram for explaining an example of presentation information.

FIG. 9 is a diagram for explaining an example of information presented by the presentation unit 353. Handwritten input information 9021 shown by a dotted line indicates a traveling route in which the robot 100 and the obstacle 402 interfere with each other. In this case, the determination unit 352 determines that the handwritten input information 9021 needs to be corrected. The presentation unit 353 determines, based on segmentation information of the captured image 310 and information about contact points between a virtual bumper of the robot 100 and the obstacle 402, contact points P1 where the robot 100 comes into contact with the obstacle 402. Then the presentation unit 353 presents handwritten input information 9022 indicating a traveling route passing through adjacent points P2 adjacent to the contact points P1. When a confirmation operation, such as pressing of a confirmation button, is input, the presentation unit 353 may cause the robot 100 to perform an operation to be performed based on the handwritten input information 9022.

Figure 10:
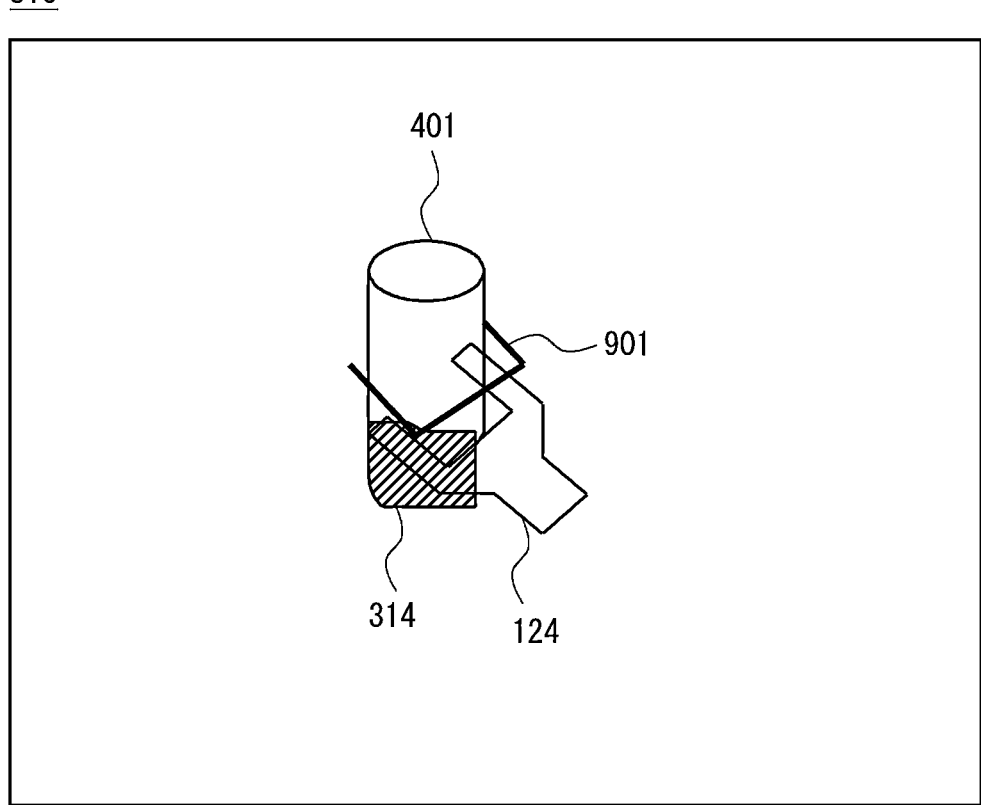
FIG. 10 is a diagram for explaining an example of presentation information.

FIG. 10 is a diagram for explaining an example of information presented by the presentation unit 353. The captured image 310 includes the handwritten input information 901 indicating a grasping operation by the robot 100. An area 314 indicates a part of the hand 124 that interferes with an obstacle (a floor), the hand 124 performing the operation indicated by the handwritten input information 901. The presentation unit 353 displays the area 314 and an area other than the area 314 so that they are distinguishable from each other. A user can check the captured image 310 and then input appropriate handwritten input information. The presentation unit 353 may further present the hand 124 operating based on the handwritten input information.

The presentation unit 353 may correct the handwritten input information and cause the robot 100 to perform the operation based on the corrected handwritten input information. The presentation unit 353 presents the corrected handwritten information to a user.

Figure 11:
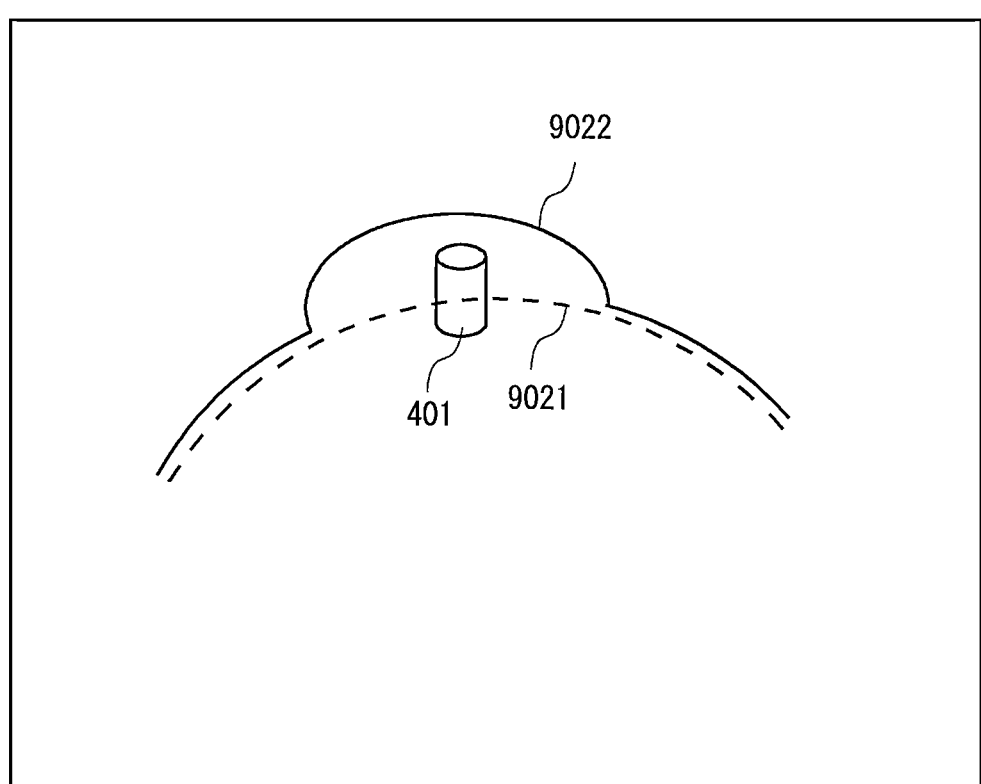
FIG. 11 is a diagram for explaining an example of a method for correcting handwritten input information.

Referring to FIG. 11, since the traveling route indicated by the handwritten input information 9021 shown by a dotted line passes through a space where the object 401 to be grasped is located, the handwritten input information 9021 needs to be corrected. In this case, the presentation unit 353 corrects the handwritten input information 9021 to the handwritten input information 9022 including a detour for bypassing the object 401 to be grasped. The detour includes, for example, an intersection of the floor and a straight line passing through the viewpoint of the stereo camera 131 and a point on the trajectory indicated by the handwritten input information 9021.

Figure 12:
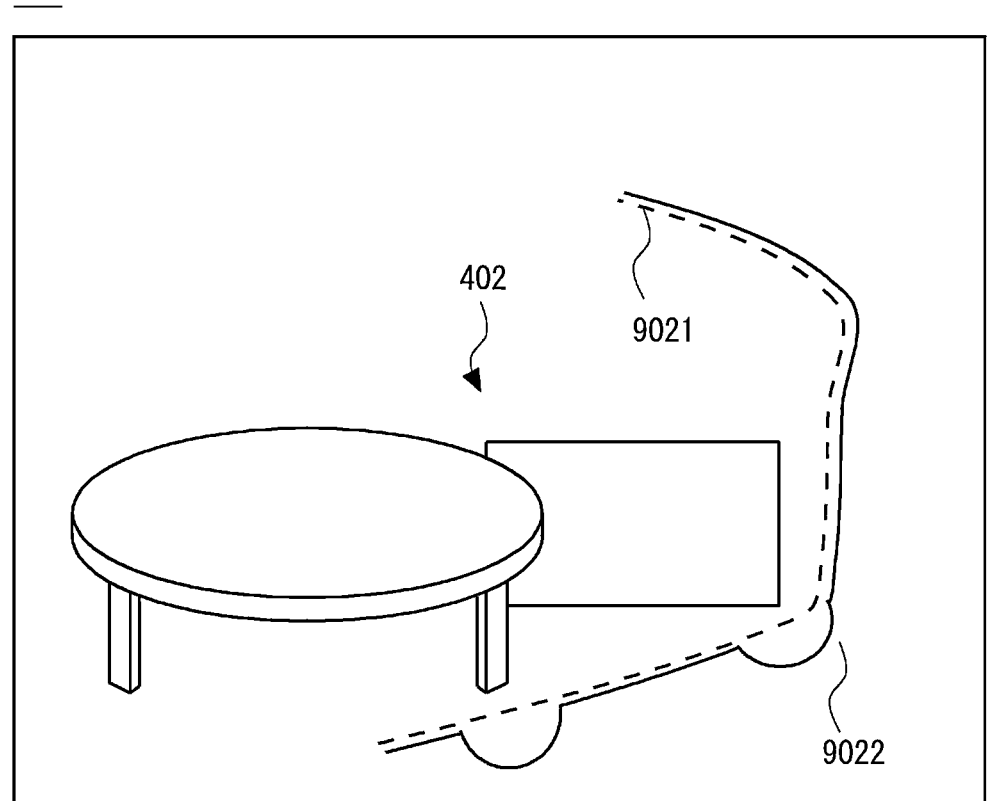
FIG. 12 is a diagram for explaining an example of a method for correcting handwritten input information.

Referring to FIG. 12, the handwritten input information 9021 shown by a dotted line indicates a traveling route passing near the obstacle 402 such as a table or a panel, and hence the handwritten input information 9021 needs to be corrected. In this case, the presentation unit 353 corrects the handwritten input information 9021 to the handwritten input information 9022 indicating a detour for bypassing the obstacle 402.

Further, when the handwritten input information indicating the traveling route of the robot 100 passes through a predetermined area where the robot 100 is included, the handwritten input information needs to be corrected. For example, when the trajectory indicated by the handwritten input information includes a point passing through an area within a predetermined radius from an area where the robot 100 is located, the presentation unit 353 may remove the point from the trajectory, thereby generating a new trajectory. Then the presentation unit 353 presents handwritten input information corresponding to the generated trajectory to a user.

Figure 13:
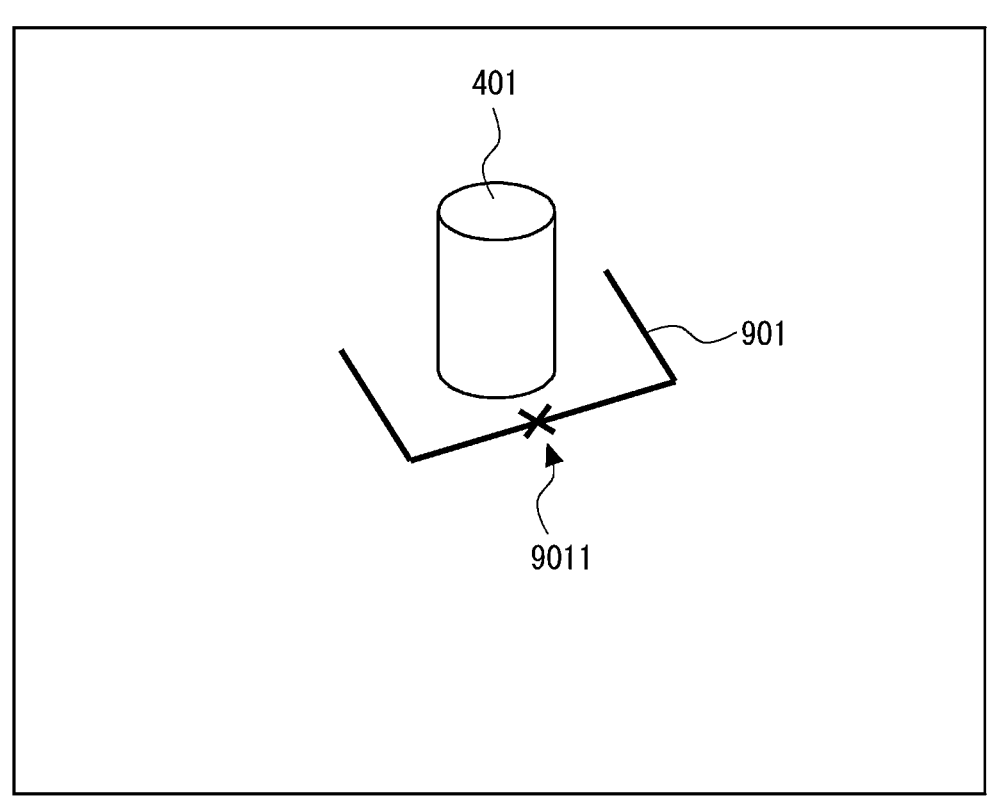
FIG. 13 is a diagram for explaining an example of a method for correcting handwritten input information.

FIG. 13 is a diagram for explaining an example of a method for correcting handwritten input information. When the handwritten input information 901 is corrected, the presentation unit 353 first corrects the position of the handwritten input information 901 until a grasping point 9011 included in the handwritten input information 901 having a U-shape is located in an area corresponding to the object 401 to be grasped. Then the presentation unit 353 gradually moves the handwritten input information 901 in the direction in which it moves away from the object 401 to be grasped until the operation to be performed based on the handwritten input information 901 can be performed. The presentation unit 353 may determine, by any other method, a grasping position and posture which is closest to the grasping position and posture estimated from the handwritten input information 901 and in which it is possible to stably grasp the object 401 to be grasped.

The presentation unit 353 may correct a position of the handwritten input information 901 using segmentation information based on a machine learning. For example, segmentation information may be used when the grasping point 9011 is positioned on the object 401 to be grasped. The segmentation information includes information indicating an area corresponding to the object 401 to be grasped.

Referring back to FIG. 6, the display panel 341 is, for example, a liquid crystal panel, and displays, for example, a captured image sent from the robot 100.

The input unit 342 includes a touch panel disposed so as to be superimposed on the display panel 141 and a push button provided on a peripheral part of the display panel 141. The input unit 342 passes handwritten input information to the control unit 350. Examples of the handwritten input information are as shown in FIGS. 2 and 3.

The memory 380 is a nonvolatile storage medium. For example, a solid-state drive is used for the memory 380. The memory 380 stores, in addition to a control program for controlling the remote terminal 300, various parameter values, functions, lookup tables, and the like used for the control and the calculation.

A communication unit 390 is, for example, a wireless LAN unit, and performs radio communication with the wireless router 700. The communication unit 390 receives a captured image sent from the robot 100 and passes it to the control unit 350. Further, the communication unit 390 cooperates with the control unit 350 to transmit handwritten input information to the robot 100.

Figure 14:
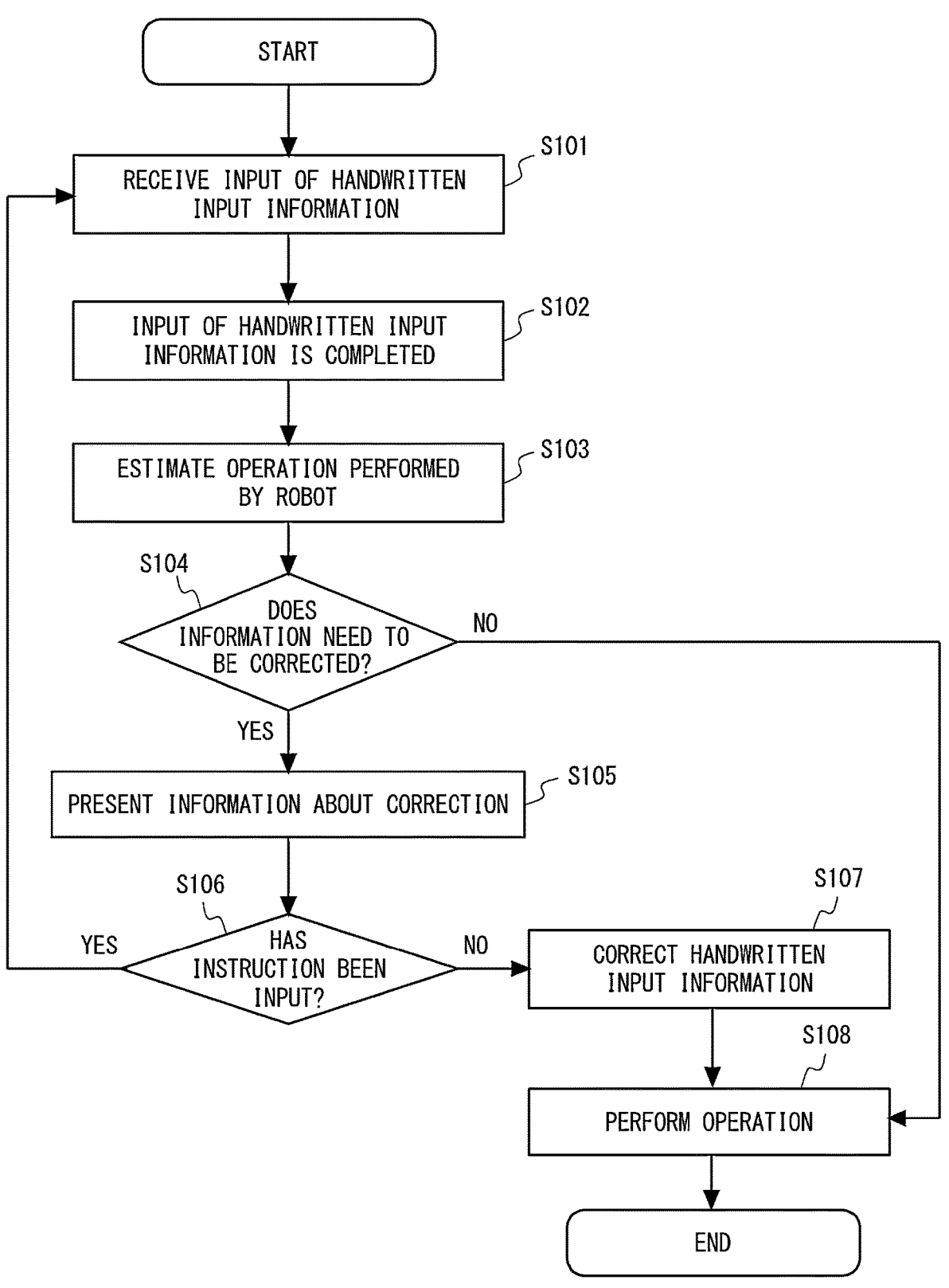
FIG. 14 is a flowchart showing an example of operations performed by the control system according to the first embodiment.

Referring to FIG. 14, an example of operations performed by the control system 10 according to the first embodiment will be described. First, the handwritten input information reception unit 351 of the remote terminal 300 displays a captured image and receives an input of handwritten input information (Step S101). At this time, the handwritten input information reception unit 351 displays a captured image and handwritten input information so that appropriate handwritten input information is input.

Next, an input of the handwritten input information by a user is completed (Step S102). Next, the determination unit 352 of the remote terminal 300 estimates an operation performed by the robot 100 based on the handwritten input information (Step S103). Next, the determination unit 352 determines whether or not the handwritten input information needs to be corrected based on feasibility or efficiency of the estimated operation (Step S104). When the handwritten input information does not need to be corrected (NO in Step S104), the remote terminal 300 transmits the handwritten input information to the robot 100, and Step S108 is then performed.

When the handwritten input information needs to be corrected (YES in Step S104), the presentation unit 353 of the remote terminal 300 presents information about the correction of the handwritten input information to a user (Step S105). The presentation unit 353 may present information about a part of the handwritten input information to be corrected, or may present the corrected handwritten input information.

Next, the handwritten input information reception unit 351 determines whether or not an instruction that the handwritten input information is to be corrected has been input by a user (Step S106). The instruction that the handwritten input information is to be corrected may be, for example, an input of appropriate handwritten input information. Further, a user may instruct the system to correct the handwritten input information to the presented handwritten input information. When an instruction that the handwritten input information is to be corrected is input by a user (YES in Step S106), Step S101 is performed.

When an instruction that the handwritten input information is to be corrected is not input by a user (NO in Step S106), the presentation unit 353 automatically corrects the handwritten input information (Step S107), and the remote terminal 300 transmits the corrected handwritten input information to the robot 100. Then, the presentation unit 353 presents the corrected handwritten input information to the user. Then, the robot 100 performs the operation based on the handwritten input information input by the user or the corrected handwritten input information (Step S108).

Next, an effect obtained by the control system 10 according to the first embodiment will be described. When a user provides an instruction to a robot by using handwritten input characters, the user can write the instruction freely. However, there is a problem that the robot may not be able to operate in accordance with the instruction. For example, when the user's instruction is not accurate or the robot cannot accurately understand the user's intention, the handwritten input characters need to be corrected.

The control system 10 according to the first embodiment can improve the operability by performing interaction with a user with regard to the correction of handwritten input information.

Note that the present disclosure is not limited to the above-described embodiments and may be changed as appropriate without departing from the scope and spirit of the present disclosure. In the above embodiments, the robot 100 and the remote terminal 300 exchange captured images and handwritten input information through the Internet 600 and the system server 500. However, the present disclosure is not limited thereto. The robot 100 and the remote terminal 300 may exchange captured images and handwritten input information by direct communication.

Further, in the above embodiments, the stereo camera 131 is used. However, the present disclosure is not limited thereto. The robot 100 may include any image capturing unit provided at any place in the first environment. The image capturing unit is not limited to a stereo camera and may be a monocular camera or the like.

Further, in the above embodiments, an example in which the robot 100 includes the hand 124 at the tip of the arm 123 as an end effector has been described. However, the present disclosure is not limited thereto. The robot 100 may be any robot including an end effector and performing a grasping operation by using the end effector. Further, the end effector may be a grasping part (e.g., a suction part) other than a hand.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, a magnetic cassette, a magnetic tape, and a magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control system configured to determine an operation to be performed by a robot based on handwritten input information input to an interface and control the operation performed by the robot, the control system comprising a central processing unit configured to:

receive an input of the handwritten input information;

determine whether or not the handwritten input information needs to be corrected based on feasibility or efficiency of the operation to be performed based on the handwritten input information; and present information about the correction of the handwritten input information to a user when the handwritten input information needs to be corrected, wherein when the central processing unit displays the input handwritten input information, the central processing unit sets a thickness of a line included in the handwritten input information based on a size of the robot, wherein the thickness of the line at a position farther from the current position of the robot is thinner than the thickness of the line at a position closer to the current position of the robot.

2. The control system according to claim 1, wherein the handwritten input information includes trajectory information of the input performed using a finger, a stylus pen, a pointing device, an Augmented Reality (AR) device, a Virtual Reality (VR) device, or a Mixed Reality (MR) device.

3. The control system according to claim 1, wherein when the handwritten input information needs to be corrected, the central processing unit corrects the handwritten input information and presents the corrected handwritten input information to the user.

4. The control system according to claim 1, wherein when the handwritten input information needs to be corrected, the central processing unit presents information about a part of the robot that interferes with an obstacle to the user, the robot operating based on the handwritten input information.

5. The control system according to claim 1, wherein
   when a part or all of the handwritten input information is included in a predetermined area of an input screen, the central processing unit determines that the handwritten input information needs to be corrected, and
   when the central processing unit displays the input screen, the central processing unit displays the predetermined area and an area other than the predetermined area so that they are distinguishable from each other.

6. The control system according to claim 1, wherein the central processing unit corrects a position of the handwritten input information using segmentation information based on a machine learning.

7. A control method for determining an operation to be performed by a robot based on handwritten input information input to an interface and controlling the operation performed by the robot, the control method comprising:
   receiving an input of the handwritten input information;

determining whether or not the handwritten input information needs to be corrected based on feasibility or efficiency of the operation to be performed based on the handwritten input information; and presenting information about the correction of the handwritten input information to a user when the handwritten input information needs to be corrected, wherein displaying the input handwritten input information, setting a thickness of a line included in the handwritten input information based on a size of the robot, wherein the thickness of the line at a position farther from the current position of the robot is thinner than the thickness of the line at a position closer to the current position of the robot.

8. A non-transitory computer readable medium storing a program for causing a computer to perform a control method for determining an operation to be performed by a robot based on handwritten input information input to an interface and controlling the operation performed by the robot, the control method comprising:
   receiving an input of the handwritten input information;

determining whether or not the handwritten input information needs to be corrected based on feasibility or efficiency of the operation to be performed based on the handwritten input information; and presenting information about the correction of the handwritten input information to a user when the handwritten input information needs to be corrected, wherein displaying the input handwritten input information, setting a thickness of a line included in the handwritten input information based on a size of the robot, wherein the thickness of the line at a position farther from the current position of the robot is thinner than the thickness of the line at a position closer to the current position of the robot.

* * * * *